United States Patent [19]

Sellwood et al.

[11] Patent Number: 4,979,087
[45] Date of Patent: Dec. 18, 1990

[54] INDUCTIVE COUPLER

[75] Inventors: Raymund E. Sellwood; Peter T. Hartfield, both of Reading, Great Britain

[73] Assignee: Aviation Limited, Berkshire, England

[21] Appl. No.: 401,320

[22] Filed: Aug. 31, 1989

[30] Foreign Application Priority Data

Sep. 9, 1988 [GB] United Kingdom ............... 8821130

[51] Int. Cl.$^5$ ............................................. H02M 5/40
[52] U.S. Cl. .................................... 363/34; 363/37
[58] Field of Search .................. 363/15, 16, 34, 37, 363/95, 97, 98, 126, 127

[56] References Cited

U.S. PATENT DOCUMENTS

| | | | |
|---|---|---|---|
| 3,522,509 | 8/1970 | Hasenbalg | 363/15 |
| 3,963,975 | 6/1976 | Gauper, Jr. et al. | 363/15 |
| 3,970,916 | 7/1976 | Kienscherf | 363/71 |
| 4,348,719 | 9/1982 | Hicks et al. | 363/16 |
| 4,578,744 | 3/1986 | Antula | 363/37 |

Primary Examiner—Peter S. Wong
Attorney, Agent, or Firm—Nixon & Vanderhye

[57] ABSTRACT

An inductive coupler (1) comprises a rectifier (2) to rectify an input alternating current power supply, a high frequency oscillator (3) driven by the rectified power supply, a modulator (4) to modulate the output of the high frequency oscillator (3) with a lower frequency alternating signal, a split transformer (6) having physically separable primary and secondary sections, and a demodulator (7). The output of the modulator (4) is coupled to the primary section of the transformer (6), and the secondary section of the transformer (6) is coupled to the demodulator (7) which demodulates the modulated high frequency signal to produce a low frequency power output. An auxiliary connector (8) connects a reference from the low frequency modulation signal imposed by the modulator (4) to the demodulator (7) to maintain synchronism.

9 Claims, 2 Drawing Sheets

INDUCTIVE COUPLER

BACKGROUND OF THE INVENTION

The majority of electrical devices and equipment in use, domestically, and in industry and commerce are supplied by power derived from an alternating current supply which operates at a nominal frequency of 50 or 60 Hz. Power supplies operating at such low frequencies enables power to be transmitted very long distances without unacceptable losses resulting from the impedance of the power supply network such as would occur if a higher frequency was used.

One way of joining conductors carrying such low frequency power supplies is to use an inductive coupler. Essentially, such couplers comprise a transformer which can be physically split into two separate parts, a primary or input section and a secondary or output section. When the two parts are together magnetic coupling takes place between the primary and the secondary sections to transfer electrical power between them. Many types of material have been used to enhance the magnetic coupling between the primary and secondary sections and these range from conventional soft iron through Swedish iron to sintered ferrite cores having a variety of forms. Irrespective of the material used for the core when the inductive coupler is handling a low frequency such as 50 or 60 Hz a large quantity of material is required for the core to provide an efficient power transfer between the two sections of the inductive coupler. By using more exotic and thus more expensive materials for the core some reduction in size can be achieved over that required for, for example, a soft iron core. However, even the most sophisticated inductive couplers used for mains power are still of a substantial size.

In many situations the substantial size of such inductive couplers is a problem. This is particularly true in the aerospace industry in submersible craft and in the sub-sea oil and mining industries where space is at a premium. In general, any reduction in the size of the magnetic core results in a reduction in the coupling efficiency and this is also unacceptable.

SUMMARY OF THE INVENTION

According to this invention an inductive coupler comprises a rectifier to rectify an input alternating current power supply, a high frequency oscillator driven by the rectified power supply, a modulator to modulate the output of the high frequency oscillator with a lower frequency alternating signal, a split transformer having physically separable primary and secondary sections, the output of the modulator being coupled to the primary section of the transformer and the secondary section of the transformer being coupled to a demodulator which demodulates the modulated high frequency signal to produce a low frequency alternating current power output, and an auxiliary connector to connect a reference from the low frequency modulation signal imposed by the modulator to the demodulator to ensure that the demodulator keeps in step with the modulator.

With the inductive coupler in accordance with this invention by first rectifying the power supply and then converting it to a high frequency in the inductive coupler the split transformer inductively couples a high frequency signal and thus the split transformer can be made very much smaller and more efficient. However, since the high frequency signal is modulated by a low frequency signal, on the output side of the inductive coupler, a low frequency alternating current power supply is produced at the output of the demodulator which corresponds to the modulation imposed by the modulator as a result of the reference connected via the auxiliary connector.

US-A-3522509 describes a magnetic coupler for providing a power supply having a direct current input and a floating direct current output. The direct current input is converted into a high frequency via a high frequency oscillator and then coupled via an isolating transformer to a rectifier and filter which re-establishes a DC output. However, the DC output is isolated from the DC input. This specification discloses that by using a frequency higher than a mains frequency typically between 10 and 20 KHz the size of the transformer and shielding of the device can be reduced.

This basic idea of reducing the size of a transformer by increasing frequency of an alternating current passing through it is also known from JP-A-59-139609 which again discloses a form of inductive coupler. In this example an input alternating current signal is first rectified and then converted to a higher frequency before being applied to one half of an inductive coupler. The other half of the inductive coupler is connected directly to the load to apply the higher frequency signal directly to the load. The higher frequency described in this specification is also between 10 and 20 KHz.

Finally US-A-3564390 describes a power converter circuit for an AC supply which includes primary and secondary centre tapped windings with switching circuits connected both sides of the transformer to switch rapidly the polarity of the AC signal on the primary side of the transformer thereby to increase its apparent frequency whilst, the corresponding switching on the secondary side of the transformer acts to counteract the polarity reversal and so restore the original frequency to the alternating signal. Thus, in effect, the power converter circuit in accordance with this invention operates at an increased rate as to compared with the conventional mains supply frequency and this increased rate is described as being between 1 and 10 KHz.

Preferably the modulator modulates the output of the high frequency oscillation at a frequency equal to or double that of the power supply fed to the rectifier of the inductive coupler. When frequency doubling is used this can be simply achieved by full wave rectification of the input power supply. When the modulation frequency is equal to the power supply, since the demodulator operates synchronously with the modulator, this ensures that the power supply downstream from the inductive coupler corresponds exactly to that upstream. The modulation imposed upon the high frequency oscillator may be an amplitude modulation, frequency modulation or, for example, a pulse width modulation. The split transformer may be of the butt coupled or co-axial type.

Preferably the rectifier, high frequency oscillator, modulator, primary side of the split transformer and one part of the auxiliary coupling are contained in one part of a housing of the inductive coupler and the secondary part of the split transformer and demodulator are contained in another part of the housing. Preferably the two parts of the housing are arranged to connect together to join the two sides of the transformer together. Typically the rectifier, oscillator, modulator and demodulator are all formed on integrated circuit chips and these, together with the smaller size of the transformer and associated magnetic core occupy a very much smaller volume than that required for a conventional mains frequency inductive coupler. Further the inductive coupler in accordance with this invention provides a more efficient electrical coupling.

Polyphase power supplies may be inductively coupled by using separate inductive couplers in accordance with this invention for each phase and the output side of the inductive couplers may be linked together with, for example, a star network.

Alternatively a polyphase output can be produced from a single phase supply by modulating the high frequency oscillator by two or more low frequency signals with a phase difference between them, and then demodulating these separately using two or more secondary windings and demodulators in the output side of the inductive coupler. Where the output of the inductive coupler is required to provide power to more than one downstream load the split transformer may include more than one winding in its secondary side with each winding being connected to a separate demodulator to provide electrically isolated power supplies to the downstream loads.

BRIEF DESCRIPTION OF THE DRAWINGS

A particular example of an inductive coupler in accordance with this invention will now be described with reference to the accompanying drawings in which.

DESCRIPTION OF PREFERRED EXAMPLE

Figure 1:
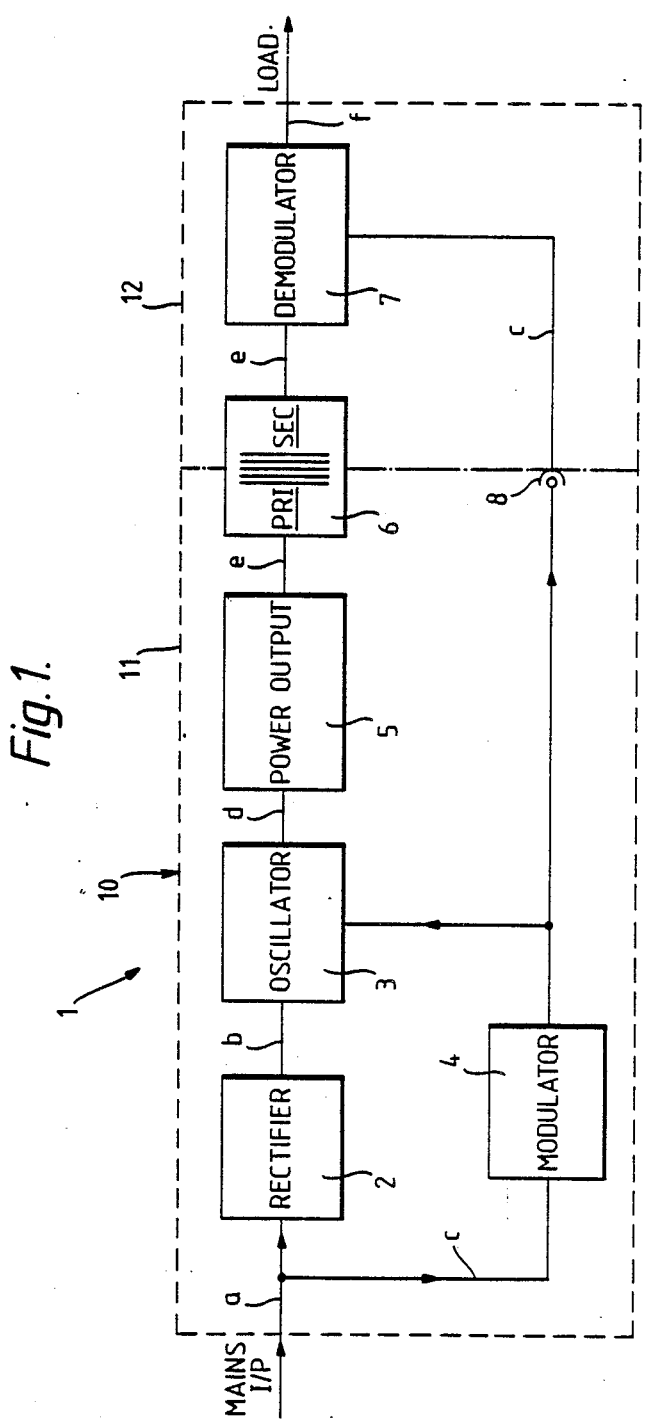
FIG. 1 is a block diagram of the inductive coupler.

An input side of an inductive coupler 1 comprises a rectifier 2 to convert the 50/60 Hz input a.c. power supply input into a d.c. power supply. An oscillator 3 is driven from the rectifier 2 and may include a phase locked loop or be crystal controlled. Typically it is capable of producing harmonic oscillations having a frequency of between 50 kHz and a 100 kHz. A modulator 4 modulates the output of the high frequency oscillator 3 with a low frequency corresponding to the mains power supply input frequency as shown in FIG. 1 or to, for example, the doubled main frequency input signal which is taken from a full wave rectifier forming part of the rectifier 2. Typically isolation of the modulator 4 from the input power line is achieved by use of a conventional double wound isolating transformer or, for example, by opto isolators. The modulator 4 may be an amplitude or frequency modulator. The modulated output from the oscillator 3 is then power amplified in a power amplifier 5. Both the modulator 4 and power amplifier 5 also receive power supplies from the rectifier 2. The output of the power amplifier 5 is then coupled to a primary winding of a split transformer 6. The secondary winding of the split transformer 6 is connected to a demodulator 7. An auxiliary connector 8 such as a conventional pin and socket connector connects a reference low frequency output from the modulator 4 to the demodulator 7 to maintain synchronism between the modulator 4 and demodulator 7. Further connectors (not shown) also provide a power supply from the rectifier 2 to the demodulator 7.

The inductive coupler is contained in a housing 10 which is separable into two parts 11 and 12 along the chain dotted line shown in FIG. 1. The two halves mate together in a conventional fashion and in so doing couple the two halves of the pin and socket auxiliary connector 8.

Figure 2:
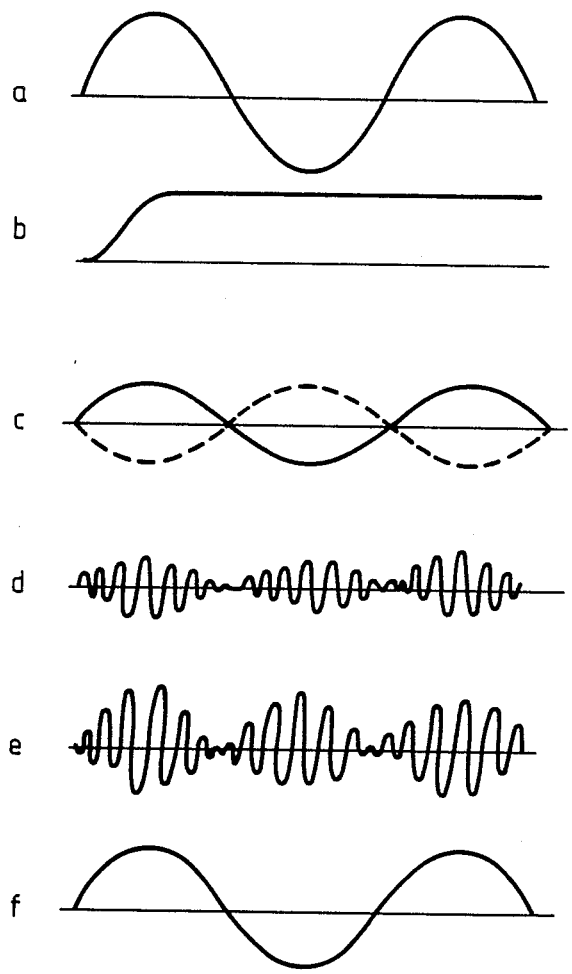
FIG. 2 is a series of graphs showing the waveform at various points of the inductive coupler.

Reference letters a to f in FIG. 1 indicate the positions at which the waveforms illustrated in FIG. 2 occur.

We claim:

1. An inductive coupler comprising:
   a rectifier having an input and an output, said rectifier comprising a means for rectifying an alternating current power supply applied to said input to produce a rectified power supply at said output;
   a high frequency oscillator, said high frequency oscillator having a power input and a high frequency signal output, said power input of said high frequency oscillator being operatively connected to an driven by, said output of said rectifier;
   a modulator, said modulator having an input and an output, said input of said modulator being operatively connected to said high frequency signal output of said high frequency oscillator, said modulator comprising a means for modulating said high frequency signal output from said high frequency oscillator with a lower frequency alternating signal;
   a split transformer means, said split transformer means having a primary and secondary section, said primary and secondary sections of said split transformer means comprising a means for rendering said sections physically separable, said output of said modulator being coupled to said primary section of said split transformer means;
   a demodulator, said demodulator having an input and an output, said input of said demodulator being operatively coupled to said secondary section of said split transformer means, said demodulator comprising a means for demodulating a high frequency signal applied to said demodulator input from said secondary section of said split transformer means and for producing at said demodulator output a low frequency alternating current power output; and,
   an auxiliary connector, said auxiliary connector having a first part operatively connected to a reference from said lower frequency alternating modulation signal imposed by said modulator and a second part operatively connected to said demodulator, said reference connected via said auxiliary connector comprising a means for ensuring that said demodulator maintains synchronism with said modulator in use of said inductive coupler.

2. The inductive coupler of claim 1, wherein said modulator modulates said output of said high frequency oscillator at a frequency equal to that of said power supply fed to said input of said rectifier.

3. The inductive coupler of claim 1, wherein said modulator modulates said output of said high frequency oscillator at a frequency double that of said power supply fed to said rectifier.

4. The inductive coupler of claim 2, wherein said output of said demodulator is at said same frequency as said power supply fed to said inductive coupler.

5. The inductive coupler of claim 3, wherein said output of said demodulator is at said same frequency as said power supply fed to said inductive coupler.

6. The inductive coupler of claim 1, wherein said modulation of said high frequency signal output by said modulator is an amplitude modulation.

7. The inductive coupler of claim 1, wherein said modulation of said high frequency signal output by said modulator is a frequency modulation.

8. The inductive coupler of claim 1, wherein said modulation of said high frequency signal output by said modulator is a pulse width modulation.

9. The inductive coupler of claim 1 including a housing having a first part and a second part, said rectifier, said high frequency oscillator, said modulator, said primary side of said split transformer and said first part of said auxiliary coupling being contained in said first part of said housing and said secondary part of said split transformer means, said second part of said auxiliary coupling and said demodulator being contained in said second part of said housing.

* * * * *